(12) United States Patent
Ying

(10) Patent No.: US 6,343,208 B1
(45) Date of Patent: Jan. 29, 2002

(54) PRINTED MULTI-BAND PATCH ANTENNA

(75) Inventor: Zhinong Ying, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/212,259

(22) Filed: Dec. 16, 1998

(51) Int. Cl.⁷ ................................................ H04B 1/40
(52) U.S. Cl. ...................... 455/90; 455/193.2; 343/702; 343/860
(58) Field of Search .......................... 455/575, 90, 550, 455/272, 273, 269, 129, 193.1, 121, 193.2; 343/702, 767, 770, 746, 860, 852, 862

(56) References Cited

U.S. PATENT DOCUMENTS

| 676,332 A | 6/1901 | Marconi |
| 1,837,678 A | 12/1931 | Ryder |
| 2,966,679 A | 12/1960 | Harris ........................ 343/895 |

(List continued on next page.)

FOREIGN PATENT DOCUMENTS

| DE | 31 29 045 | 10/1982 |
| DE | 197 07 535 | 8/1998 |
| EP | 0 372 720 | 6/1990 |
| EP | 0 511 577 | 11/1992 |
| EP | 0 522 806 | 1/1993 |
| EP | 0 593 185 | 4/1994 |
| EP | 0 635 898 | 1/1995 |
| EP | 0 644 606 | 3/1995 |
| EP | 0 660 440 | 6/1995 |
| EP | 0 747 989 | 12/1996 |
| EP | 0 777 293 | 6/1997 |
| EP | 0 795 926 | 9/1997 |
| EP | 0 855 759 | 7/1998 |
| EP | 0 892 459 | 1/1999 |
| FR | 2 664 749 | 1/1992 |
| GB | 655045 | 7/1951 |
| GB | 2175748 | 12/1986 |
| GB | 2288284 A | 10/1995 |
| JP | 63-219204 | 9/1988 |
| JP | 6-37531 | 2/1994 |
| JP | 6-90108 | 3/1994 |
| JP | 6-15221 | 5/1994 |
| JP | H10-173430 | 6/1998 |
| WO | WO93/12559 | 6/1993 |
| WO | WO94/21003 | 9/1994 |
| WO | WO96/27219 | 9/1996 |
| WO | WO96/38882 | 12/1996 |
| WO | WO97/11507 | 3/1997 |
| WO | WO97/49141 | 12/1997 |
| WO | WO98/44587 | 10/1998 |
| WO | WO98/49742 | 11/1998 |

OTHER PUBLICATIONS

"Microwave Filters and Antennas for Personal Communication Systems" (Inverted–F Antenna For Portable Handsets), Feb. 22, 1994, Electronics Division, Professional Groups E12, Digest No. 1994/047.

"Short Sinusoidal Antennas for Wireless Communications" by M. Ali et al., 1995 IEEE, pp. 542–545.

"A Wideband Dual Meander Sleeve Antenna" by M. Ali et al., 1995 IEEE, pp. 1124–1127.

(List continued on next page.)

Primary Examiner—Edward F. Urban
(74) Attorney, Agent, or Firm—Burns, Doane, Swecker & Mathis, L.L.P.

(57) ABSTRACT

The present invention provides a miniature, built-in multi-band antenna which is suitable for use in future compact mobile terminals. According to exemplary embodiments, a built-in patch antenna is provided which includes patch elements of different sizes and capable of being tuned to different frequency bands. On each patch element is formed a slot which divides the patch element into sub-parts. Each sub-part of a patch element is structured so as to be resonant at a frequency in the same frequency band to which the patch element is tuned. As a result, a high efficiency, broad band, multi-band, and surface mountable low profile antenna can be realized.

29 Claims, 9 Drawing Sheets

U.S. PATENT DOCUMENTS

| | | | |
|---|---|---|---|
| 2,993,204 A | 7/1961 | Macalpine | 343/745 |
| 3,573,840 A | 4/1971 | Gouillou et al. | 343/745 |
| 4,012,744 A | 3/1977 | Greiser | 343/895 |
| 4,121,218 A | 10/1978 | Irwin et al. | 343/702 |
| 4,137,534 A | 1/1979 | Goodnight | 343/752 |
| 4,161,737 A | 7/1979 | Albright | 343/749 |
| 4,169,267 A | 9/1979 | Wong et al. | 343/895 |
| 4,229,743 A | 10/1980 | Vo et al. | 343/749 |
| 4,356,492 A | 10/1982 | Kaloi | 343/700 |
| 4,571,595 A | 2/1986 | Phillips et al. | 343/745 |
| 4,723,305 A | 2/1988 | Phillips et al. | 455/89 |
| 4,742,359 A | 5/1988 | Ishino et al. | 343/895 |
| 4,860,020 A | 8/1989 | Wong et al. | 343/828 |
| 4,868,576 A | 9/1989 | Johnson, Jr. | 343/702 |
| 5,020,093 A | 5/1991 | Pireh | 379/59 |
| 5,204,687 A | 4/1993 | Elliott et al. | 343/702 |
| 5,216,436 A | 6/1993 | Hall et al. | 343/895 |
| 5,241,322 A | 8/1993 | Gegan | 343/700 |
| 5,298,910 A | 3/1994 | Takei et al. | 343/895 |
| 5,311,201 A | 5/1994 | Lillie et al. | 343/791 |
| 5,317,325 A | 5/1994 | Bottomley | 343/702 |
| 5,353,036 A | 10/1994 | Baldry | 343/702 |
| 5,363,114 A | 11/1994 | Shoemaker | 343/828 |
| 5,386,203 A | 1/1995 | Ishihara | 333/129 |
| 5,436,633 A | 7/1995 | Liu | 343/723 |
| 5,438,339 A | 8/1995 | Itoh et al. | 343/702 |
| 5,446,469 A | 8/1995 | Makino | 343/702 |
| 5,451,974 A | 9/1995 | Marino | 343/895 |
| 5,467,096 A | 11/1995 | Takamoro et al. | 343/702 |
| 5,471,221 A | 11/1995 | Nalbandian et al. | 343/700 |
| 5,479,178 A | 12/1995 | Ha | 343/702 |
| 5,532,703 A | 7/1996 | Stephens et al. | 343/702 |
| 5,546,094 A | 8/1996 | Egashira | 343/702 |
| 5,548,827 A | 8/1996 | Hanawa et al. | 455/129 |
| 5,550,820 A | 8/1996 | Baran | 370/60.1 |
| 5,594,457 A | 1/1997 | Wingo | 343/702 |
| 5,612,704 A | 3/1997 | Cole | 343/702 |
| 5,635,943 A | 6/1997 | Grunwell | 343/702 |
| 5,661,496 A | 8/1997 | Baek et al. | 343/702 |
| 5,754,143 A | 5/1998 | Warnagiris et al. | 343/767 |
| 5,917,450 A * | 6/1999 | Tsunekawa et al. | 343/700 MS |
| 6,225,958 B1 * | 5/2001 | Amano et al. | 343/767 |
| 6,278,864 B1 * | 8/2001 | Cummins et al. | 455/90 |

OTHER PUBLICATIONS

Patent Abstracts of Japan, JP–0236602, Sep. 30, 1994.

"Antennas" by J.D. Kraus, (McGraw–Hill Book Co., Inc.) pp. 173–178 (1950).

Microwave Scanning Antennas by R.C. Hansen, Peninsula Publishing, pp. 116–122 (1950).

Rasinger J., et al., "Interne Antennen Für Schnurlostelefone", NTZ Nachrichten Technische Zeitschrift, vol. 43, No. 5, May 1, 1990, pp. 376–379, XP000126245.

Krall, A.D. et al., "Simple Photolithic Masks of Mathematical Curves", The Review of Scientific Instruments, vol. 43, No. 9, Sep. 1972, pp. 1377–1378, XP002105733.

Hirose, K. et al., "Dual–Spiral Slot Antennas", IEE Proceedings H. Microwaves, Antennas & Propagation, vol. 138, No. 1, Part H, Feb. 1, 1991, pp. 32–36, XP000204589.

* cited by examiner

PRINTED MULTI-BAND PATCH ANTENNA

RELATED APPLICATIONS

This application is related to U.S. patent application Ser. No. 09/112,366 to Ying, filed Jul. 9, 1998, and entitled "Miniature Printed Spiral Antenna for Mobile Terminals" and U.S. patent application Ser. No. 09/112,152 to Ying, filed Jul. 9, 1998, and entitled "Twin Spiral Dual Band Antenna" now U.S. Pat. No. 6,166,694, both of which are incorporated by reference in their entireties herein.

BACKGROUND

The present invention relates generally to radio communication systems and, in particular, to built-in antennas which can be incorporated into portable terminals and which allow the portable terminals to communicate within different frequency bands.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems. Once created, these standards tend to be reused in the same or similar form, to specify additional systems. For example, in addition to the original GSM system, there also exists the DCS1800 (specified by ETSI) and PCS1900 (specified by JTC in J-STD-007), both of which are based on GSM.

However, the most recent evolution in cellular communication services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States to include six different frequency bands (A, B, C, D, E and F) in the 1900 MHz region. Thus, eight frequency bands are now available in any given service area of the U.S. to facilitate communication services. Certain standards have been approved for the PCS hyperband (e.g., PCS1900 (J-STD-007)), while others have been approved for the Cellular hyperband (e.g., D-AMPS (IS-136)).

Each one of the frequency bands specified for the Cellular and PCS hyperbands is allocated a plurality of traffic channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, handoff, and cell selection or reselection instructions as a mobile station travels out of the radio coverage of one cell and into the radio coverage of another cell. The control and voice channels may operate using either analog modulation or digital modulation.

The signals transmitted by a base station in the downlink over the traffic and control channels are received by mobile or portable terminals, each of which have at least one antenna. Historically, portable terminals have employed a number of different types of antennas to receive and transmit signals over the air interface. For example, monopole antennas mounted perpendicularly to a conducting surface have been found to provide good radiation characteristics, desirable drive point impedances and relatively simple construction. Monopole antennas can be created in various physical forms. For example, rod or whip antennas have frequently been used in conjunction with portable terminals. For high frequency applications where an antenna's length is to be minimized, another choice is the helical antenna.

As described above, it will soon be commercially desirable to offer portable terminals which are capable of operating in widely different frequency bands, e.g., bands located in the 900 MHz region and bands located in the 1800 MHz region. Accordingly, antennas which provide adequate gain and bandwidth in both frequency bands will need to be employed in portable terminals in the near future. Several attempts have been made to create such dual-band antennas.

For example, U.S. Pat. No. 4,571,595 to Phillips et al. describes a dual-band antenna having a sawtooth-shaped conductor element. The dual-band antenna can be tuned to either of two closely spaced apart frequency bands (e.g, centered at 915 MHz and 960 MHz). This antenna design is, however, relatively inefficient since it is so physically close to the chassis of the mobile phone.

Japanese patent no. 6-37531 discloses a helix which contains an inner parasitic metal rod. In this patent, the antenna can be tuned to dual resonant frequencies by adjusting the position of the metal rod. Unfortunately, the bandwidth for this design is too narrow for use in cellular communications.

Dual-band, printed, monopole antennas are known in which dual resonance is achieve by the addition of a parasitic strip in close proximity to a printed monopole antenna. While such an antenna has enough bandwidth for cellular communications, it requires the addition of a parasitic strip. Moteco AB in Sweden has designed a coil matching dual-band whip antenna and coil antenna, in which dual resonance is achieved by adjusting the coil matching component (¼ λ for 900 MHz and ½ λ for 1800 MHz). This antenna has relatively good bandwidth and radiation performances and a length in the order of 40 mm. A non-uniform helical dual-band antenna which is relatively small in size is disclosed in copending, commonly assigned U.S. patent application Ser. No. 08/725,507, entitled "Multiple Band Non-Uniform Helical Antennas."

Presently, antennas for radio communication devices, such as mobile phones, are mounted directly on the phone chassis. However, as the size and weight of portable terminals continue to decrease, the above-described antennas become less advantageous due to their size. Moreover, as the functionality of these future compact portable terminals increases, the need arises for a built-in miniature antenna which is capable of being resonant at multiple frequency bands.

Conventional built-in antennas currently in use in mobile phones include microstrip antennas and planar inverted-F antennas. Microstrip antennas are small in size and light in weight. The planar inverted-F antenna (PIFA) has already been implemented in a mobile phone handset, as described by K. Qassim, "Inverted-F Antenna for Portable Handsets", IEE Colloqium on Microwave Filters and Antennas for Personal Communication Systems, pp.3/1–3/6, Febuary 1994, London, UK. And, more recently, Lai et al. has published a meandering inverted-F antenna (WO 96/27219). This antenna has a size which is about 40% of that of the conventional PIFA antenna.

FIGS. 1A and 1B illustrate the conventional planar patch antenna compared to the meandering inverted-F antenna described in Lai et al. The conventional planar patch antenna of FIG. 1A has both a size and length equal to, for example, a quarter wavelength of the frequency to which the antenna is to be made resonant. The conventional planar patch antenna also has a width W. The meandering inverted-F antenna, illustrated in FIG. 1B, also has a length equal to a quarter wavelength of the resonant frequency and a width equal to W; however, the size of the meandering inverted-F antenna is reduced to about 40% of the size of the conventional planar patch antenna. This reduction in size is attributable to the antenna's meandering shape.

However, as mobile phones become smaller and smaller, both conventional microstrip patch and PIFA antennas are still too large to fit the future small phone chassis. In copending, commonly assigned U.S. patent application Ser. No. 09/112,366, entitled "Miniature Printed Spiral Antenna for Mobile Terminals", a printed spiral built-in antenna with a matching post was proposed. The size of the antenna was reduced to 20–30% of the conventional PIFA antenna (less than $\frac{1}{10}$ of wavelength) thereby making it suitable for future mobile phones.

In addition to a reduced antenna size, next generation mobile phones will require the capability to tune to more than one frequency band for cellular, wireless local area network, GPS and diversity. In copending, commonly assigned U.S. patent application Ser. No. 09/112,152, entitled "Twin Spiral Dual Band Antenna", a multiple band, built-in antenna was proposed which is suitable for future mobile phones. The built-in antenna comprises two spiral conductor arms which are of different lengths and capable of being tuned to different frequency bands. In order to increase bandwidth of the antenna, a resistor loading technique is introduced.

There exists a need for an efficient, miniature, built-in antenna which is capable of tuning to multiple frequency bands while simultaneously having a broad bandwidth in each of those multiple frequency bands.

SUMMARY

The present invention overcomes the above-identified deficiencies in the art by providing a miniature, built-in multi-band patch antenna which is suitable for use in future compact mobile terminals. According to exemplary embodiments, a built-in patch antenna is provided which includes patch elements of different sizes and capable of being tuned to different frequency bands. On each patch element is formed a slot which divides the patch element into sub-parts. Each sub-part of a patch element is structured so as to be resonant at a frequency in the same frequency band to which the patch element is tuned. As a result, a high efficiency, broad band, multi-band, and surface mountable low profile antenna can be realized.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 2:
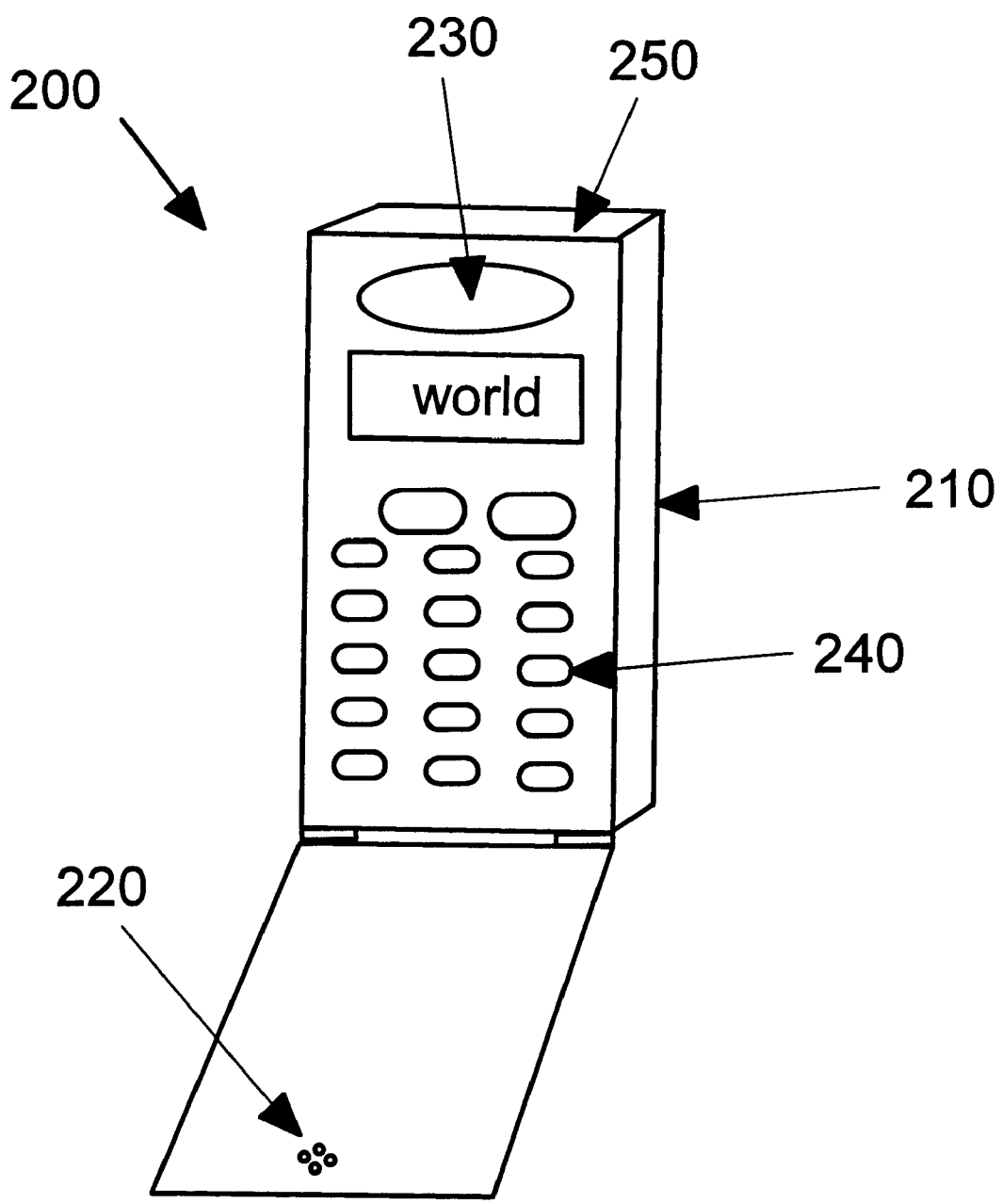
FIG. 2 illustrates an exemplary radio communication device in which the antenna of the present invention may be implemented.

FIG. 2 illustrates an exemplary radio communication device 200 in which the built-in multiple band patch antenna of the present invention may be implemented. Communication device 200 includes a chassis 210 having a microphone opening 220 and speaker opening 230 located approximately next to the position of the mouth and ear, respectively, of a user. A keypad 240 allows the user to interact with the communication device, e.g., by inputting a telephone number to be dialed. The communication device 200 also includes a built-in patch antenna assembly 250, the details of which will be described below.

Figure 3:
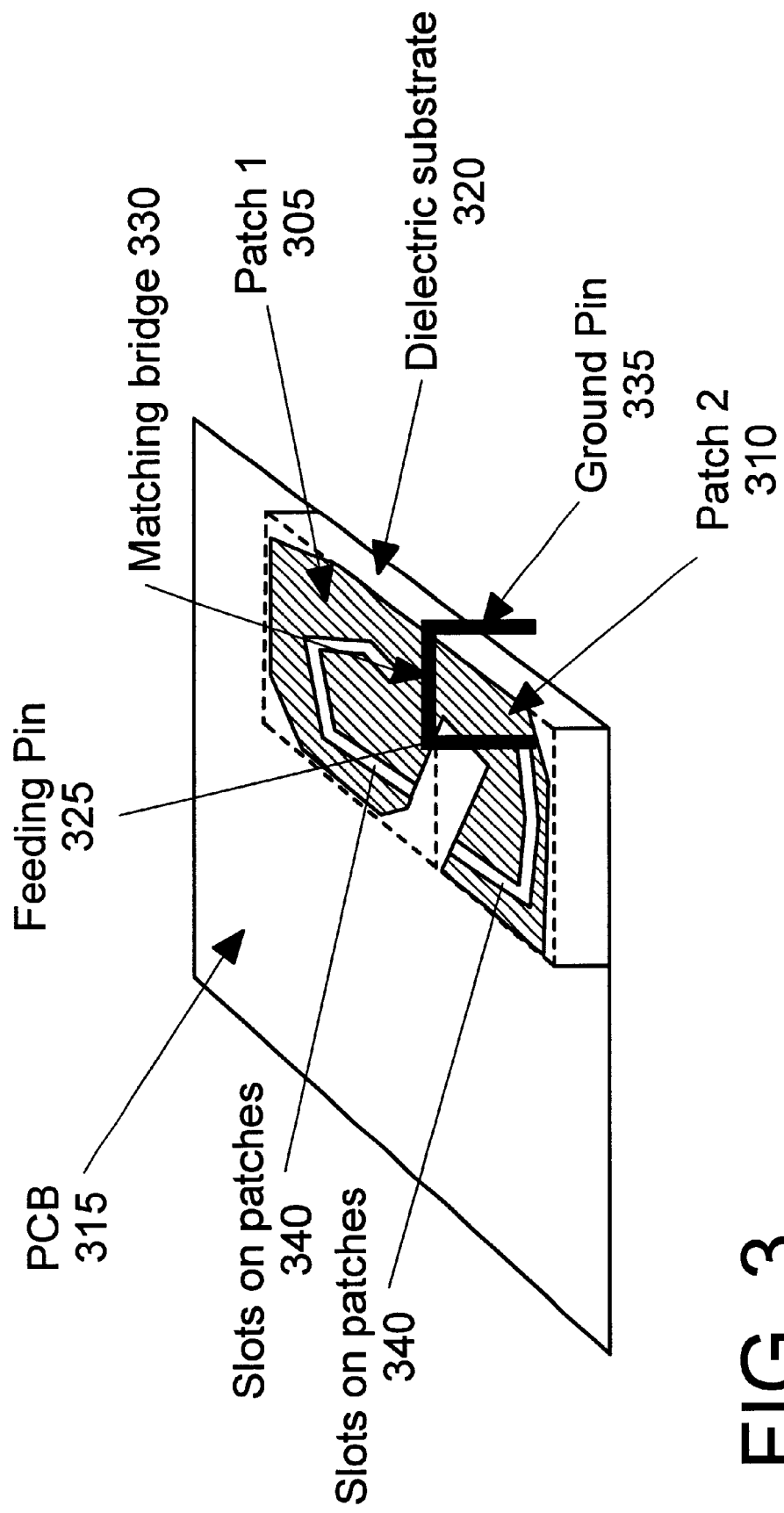
FIG. 3 illustrates an exemplary built-in multiple band patch antenna according to the present invention.

FIG. 3 illustrates an exemplary built-in patch antenna assembly according to the present invention. The exemplary built-in patch antenna assembly, according to the present invention, comprises two patch parts 305 and 310, each having a different size. The two patch parts 305 and 310 are attached to the printed circuit board (PCB) 315 via a dielectric substrate 320 and are connected to opposite sides of a matching bridge 330. A slot 340 is formed in each patch part 305 and 310 which divides the patch parts into sub-parts, the importance of which is discussed in detail below. The patch parts 305 and 310 are positioned over the PCB 315 and form slots between the patch parts and the PCB 315. One skilled in the art will appreciate that the patch parts form the main radiators (or sensors) of the present antenna system.

As evident from FIG. 3, the patch parts 305 and 310 are fed by the feeding pin 325. The built-in antenna also includes a matching bridge 330 positioned between the feeding pin 325 and the grounded post 335. The matching bridge 330 acts to tune the antenna and forms a small loop antenna between the feeding pin 325 and grounded post 335. Tuning of an antenna refers to matching the impedance seen by an antenna at its input terminals such that the input impedance is seen to be purely resistive, i.e., it will have no appreciable reactive component. The tuning of the antenna system of the present invention is performed by measuring or estimating the input impedance associated with an antenna and providing an appropriate impedance matching circuit (i.e., the matching bridge). The matching of the antenna, according to the present invention, can be adjusted by changing the length of the matching bridge 330. This is accomplished by simply changing the location of the grounded post 335. The length of the matching bridge is generally in the order of 0.01λ to 0.1λ.

It is evident from FIG. 3 that the two patch parts 305 and 310 of the antenna system are of different sizes. By controlling the size of the patch parts, the antenna is capable of being tuned to different frequencies. The first patch part 305 of the multiple band antenna is of a size (generally a quarter wavelength of the frequency band to which the patch part is to be tuned) so as to be resonant at frequencies in a first lower band, and the second patch part 310 is of a size so as to be resonant at frequencies in a second higher band. The two patch parts can be made resonant at any frequency. For example, the first band may be the GSM band and the second band may be the DCS band. One skilled in the art will appreciate that other combinations of frequency bands may be implemented without departing from the spirit and scope of the present invention. For example, other possible combinations of low and high bands could include GSM+PCS, GSM+WCDMA, DCS+WCDMA, GSM+GPS, GSM+ISM, or any other combination of lower and higher frequency bands.

As set forth above, each patch part 305 and 310 includes a slot 340 which acts to separate the patch part into sub-parts. Each sub-part of a patch part is resonant at a different frequency within the same frequency band to which the patch part is tuned. For example, if the first patch part 305 is of a size so as to be resonant at frequencies in the GSM band, then the sub-parts of patch part 305 could be made resonant at different frequencies within the GSM band. As a result, a broader bandwidth can be achieved.

Figure 4:
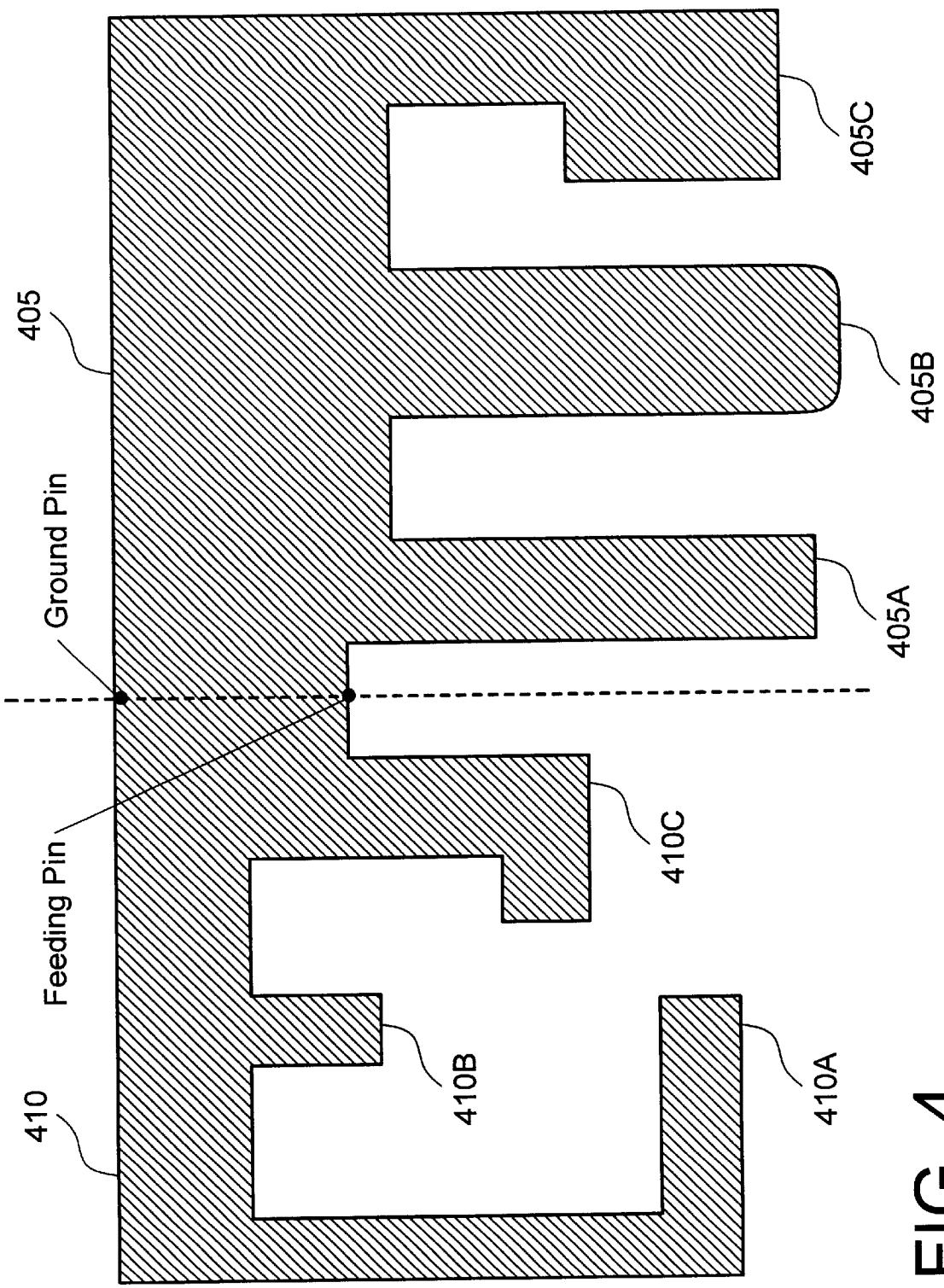
FIG. 4 illustrates an exemplary antenna configuration in which each patch part is formed of three sub-parts.

One skilled in the art will appreciate that, as an alternative, three or more sub-parts can be formed in each patch part. FIG. 4 illustrates an exemplary configuration in which each patch part is formed of three sub-parts. As illustrated, the first patch part 405 is cut into three sub-parts 405A–405C and the second patch part 410 is also cut into three sub-parts 410A–410C. Each of the sub-parts can be made resonant at a different frequency within the same frequency to which their respective patch part is resonant. As such, broader bandwidth can be achieved by such a configuration, however, tuning is more difficult.

Returning to FIG. 3, the patch parts 305 and 310 can be of any shape, including three dimensional. The size of the patch parts, however, should be approximately a quarter of the wavelength of the frequency to which the patch parts are to be tuned.

The resonant frequencies and bandwidth of the built-in multiple band patch antenna of the present invention are dependent upon the area and thickness of the dielectric substrate, the type of dielectric material selected (i.e., the dielectric constant), the patch size and the size and location of the slots. One skilled in the art will appreciate that an increase in the area or thickness of the dielectric substrate or patch size or a decrease in the value of the dielectric constant results in an increase in the bandwidth which can be achieved. Moreover, the bandwidth also depends on the size and location of the slots formed in the patch parts.

As is evident from FIG. 3, the built-in multiple band patch antenna of the present invention can be mounted at the edge of the PCB which provides for better radiation efficiency and bandwidth. In addition, the PCB space requirement for the built-in multiple band patch antenna is minimized due to its small size.

Figure 1A:
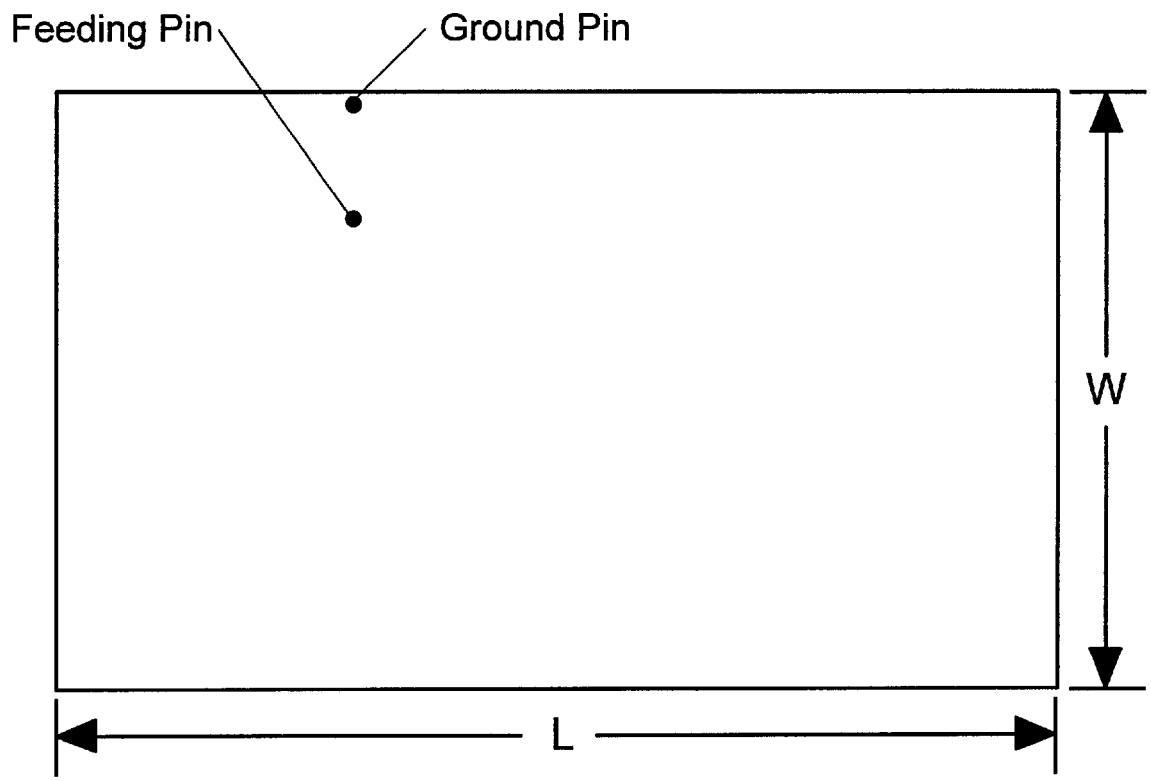
FIGS. 1A and 1B illustrate the conventional planar patch antenna compared to the conventional meandering inverted-F antenna.
Figure 1B:
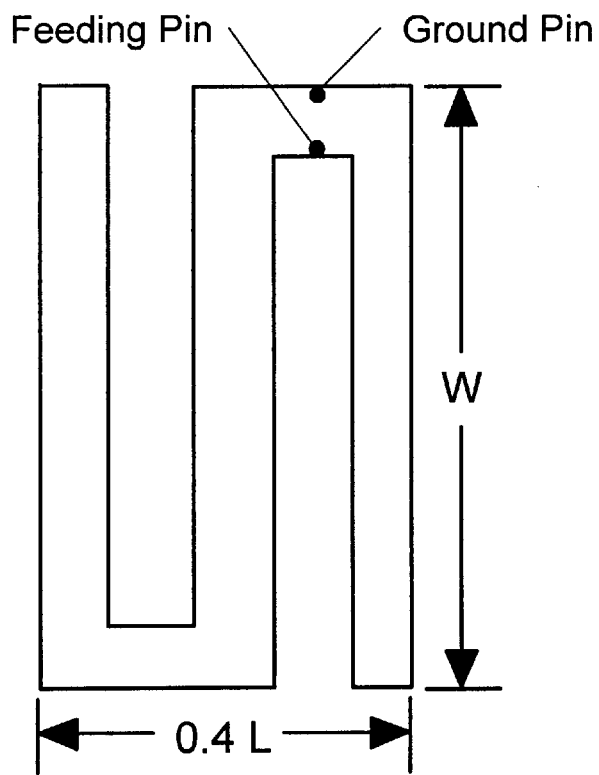
Figure 5A:
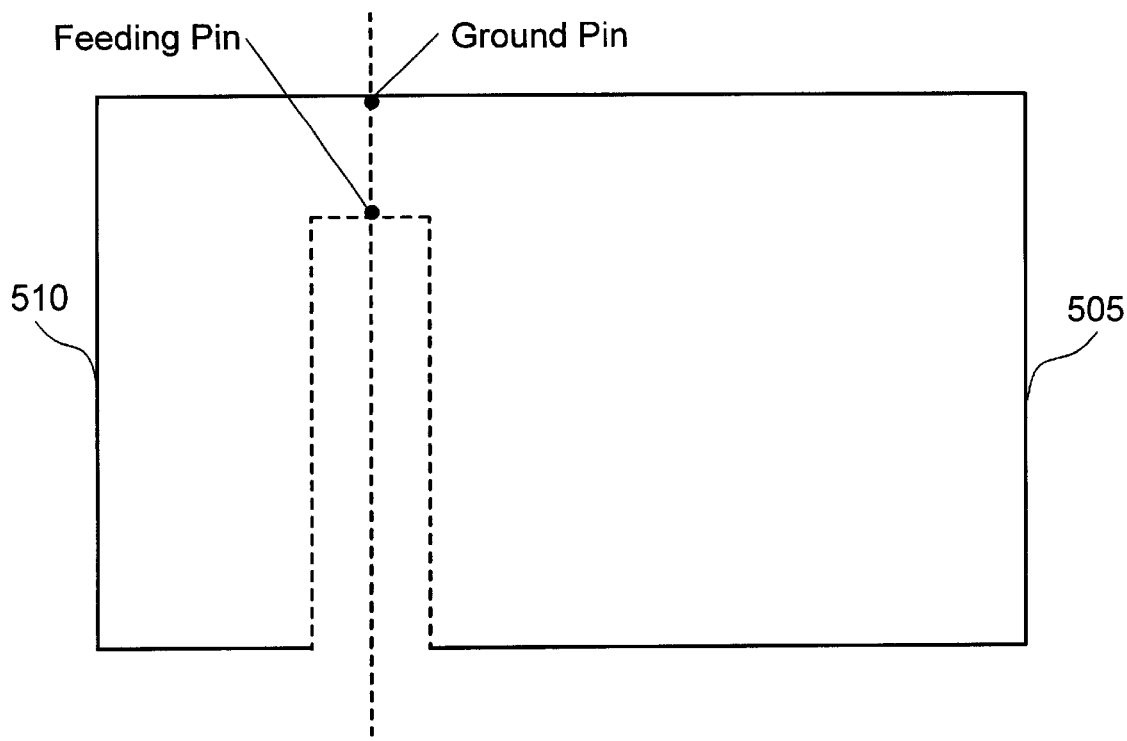
FIGS. 5A and 5B illustrate the process of forming a broad band, multiple band antenna according to the present invention.
Figure 5B:
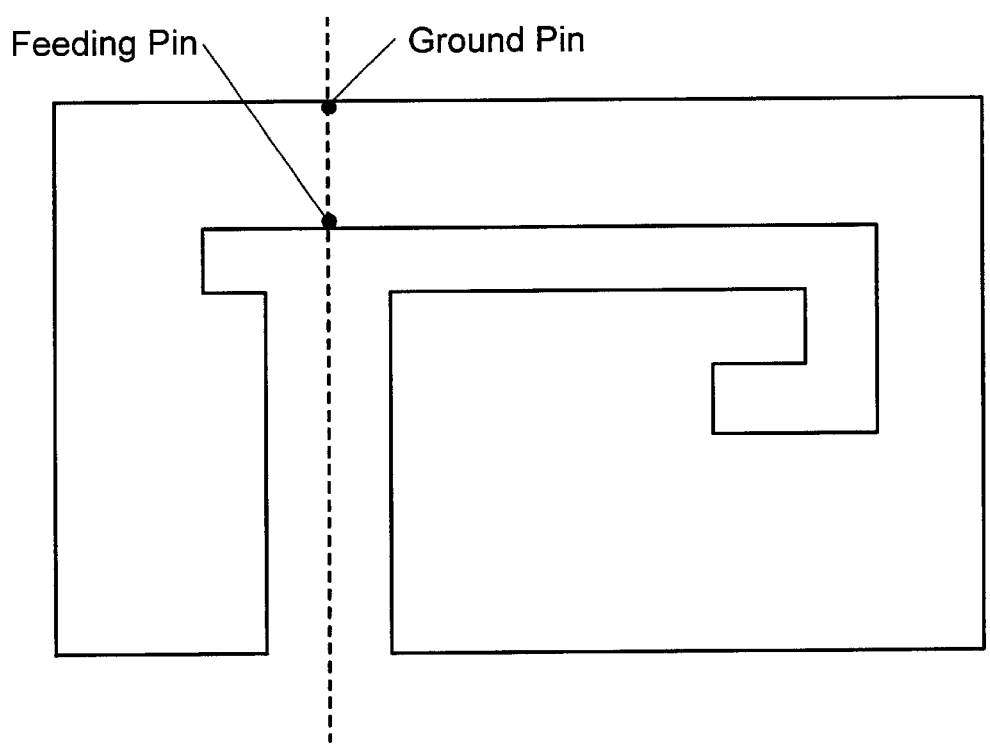

FIGS. 5A and 5B illustrate a technique by which the broad band, multiple band patch antenna of the present invention is formed. The broad band, multiple band patch antenna of the present invention can be formed from a conventional patch antenna by forming a slot in the conventional patch antenna, such as the one illustrated in FIG. 1A, along an axis of the matching bridge so that two patch parts are created, connected to opposite sides of the matching bridge (see FIG. 5A). Each part is a size so as to be resonant at a different frequency. The larger part 505 is resonant at a lower frequency and the smaller part 510 is resonant at a higher frequency. The actual forming of the slot can be performed by any one of the following methods: cutting, etching, MID (3D metalization) or chemical processing.

A slot is then formed in each patch part so as to divide each patch part into sub-parts (see FIG. 5B). The slots can be of an arbitrary shape; however, slot shape affects the achievable bandwidth. As indicated above, each sub-part of a patch part is resonant at a different frequency within the same frequency band to which the patch part is tuned thereby increasing the bandwidth of the antenna.

FIGS. 6A–6D illustrate patch antenna designs. One skilled in the art will appreciate that the shapes and sizes of the patch parts in the following figures is merely exemplary and that many other possible patch shapes and sizes may be employed without departing from the spirit and scope of the present invention.

Figure 6A:
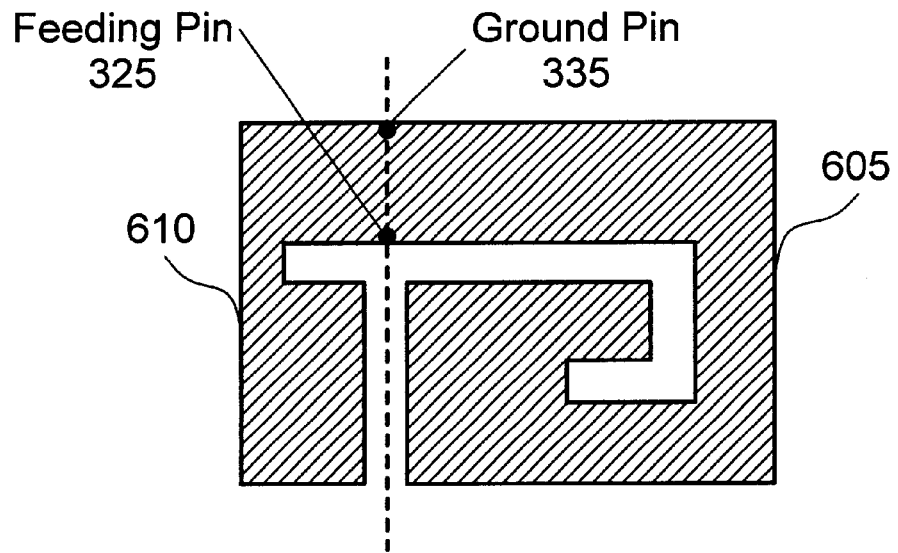
FIG. 6A illustrates a top view of a rectangular two-part dual band patch antenna according to a first exemplary embodiment of the present invention.

FIG. 6A illustrates a top view of a rectangular two-part dual band patch antenna according to a first exemplary embodiment of the present invention. The dashed line which goes through the feeding pin 325 and the grounded pin 335 divides the patch into right and left parts 605 and 610, respectively. The right part 605, which has a larger size, is a low frequency resonator and the left part 610 is a high frequency resonator. As evident from FIG. 6A, the slot is formed on each of the patch parts so as to produce a twin spiral configuration, similar to that presented in U.S. patent application Ser. No. 09/112,152. In this case, however, the spiral strip line is actually a spiral patch, resulting in an improvement in bandwidth.

Figure 6B:
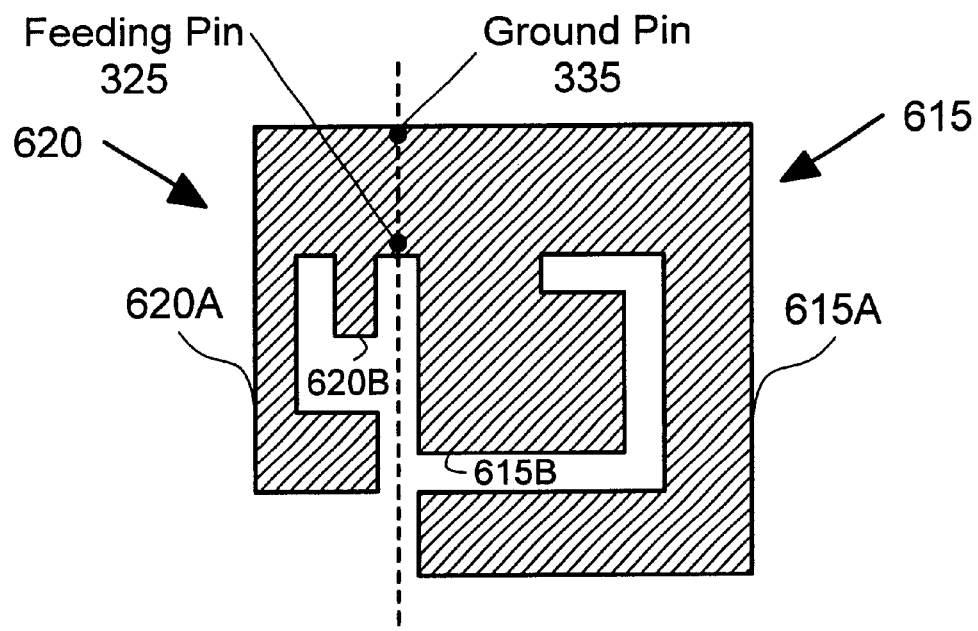
FIG. 6B illustrates a two-part L slot patch antenna according to a second exemplary embodiment of the present invention.
Figure 7:
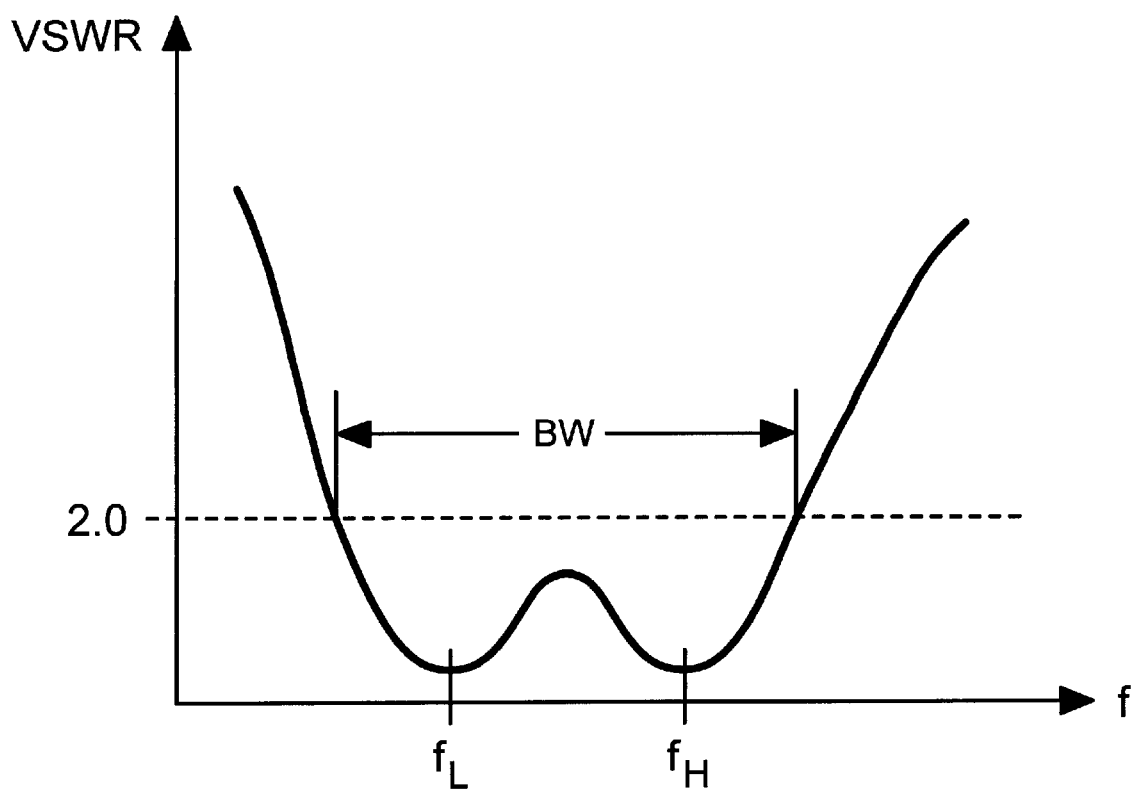
FIG. 7 provides a chart which illustrates the bandwidth which can be achieved from the sub-parts of the larger patch part in FIG. 6B.

FIG. 6B illustrates a two-part L slot patch antenna according to a second exemplary embodiment of the present invention. As illustrated, each patch part 615 and 620 is rectangular in shape. As in FIG. 6A, the dashed line separates the patch into right and left parts 615 and 620, respectively. The right part 615 is a low frequency resonator and the left part 620 is a high frequency resonator. An L-shaped slot is formed on each patch part. These slots divide the patch parts into two sub-parts. The right part, for example, is divided into sub-parts 615A and 615B. Similarly, the left part 620 is divided into sub-parts 620A and 620B. As set forth above, each sub-part of a patch part is resonant at a different frequency in the same frequency band to which the patch part is tuned. For sub-parts 615A and 615B, for example, the outer sub-part 615A is resonant at a lower frequency ($f_L$) and the inner part 615B is resonant at a higher frequency ($f_H$). As a result, broad bandwidth is achieved within the same frequency band. FIG. 7 illustrates the multi-resonance capability of the patch parts, according to this embodiment of the present invention. As shown, wide bandwidth matching can be realized.

Figure 6C:
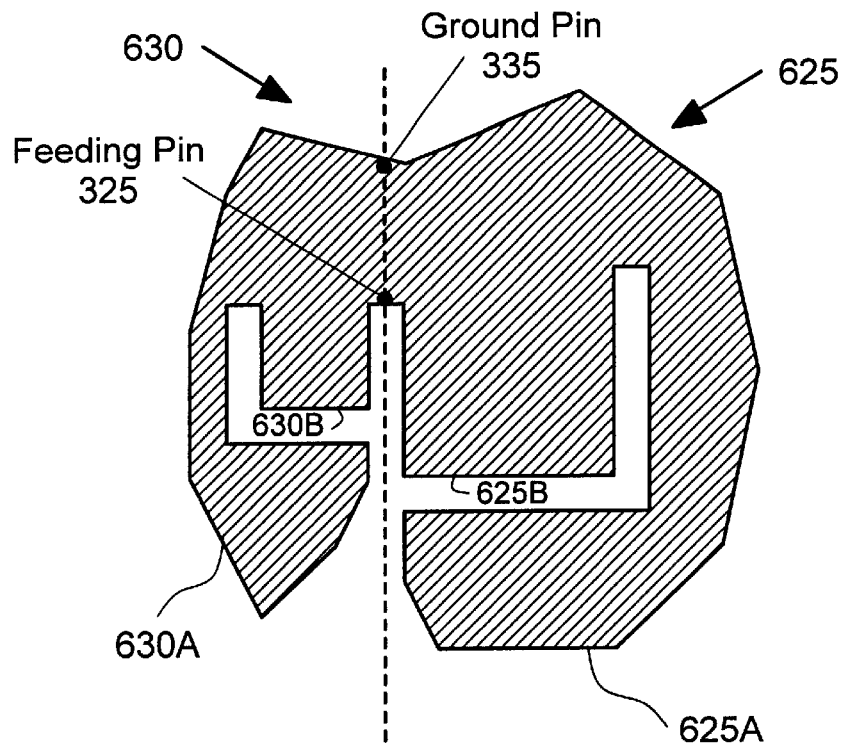
FIG. 6C illustrates a two-part L-slot patch antenna, according to a third exemplary embodiment of the present invention, in which the patch is of an arbitrary shape.
Figure 6D:
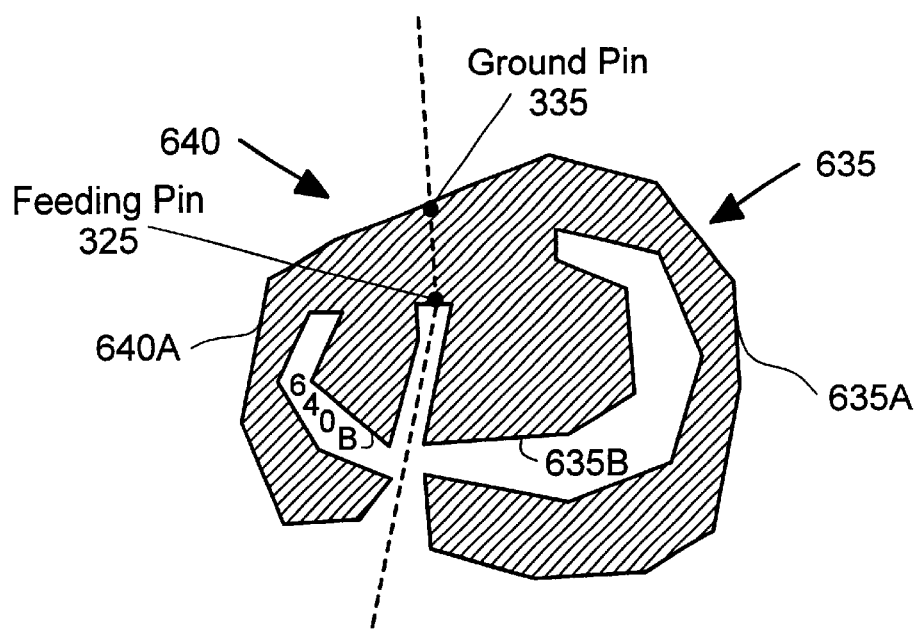
FIG. 6D illustrates a two-part slot-patch antenna, according to a fourth exemplary embodiment of the present invention, in which both the patch and the slots are of arbitrary shapes.

FIGS. 6C and 6D illustrate exemplary configurations in which, in FIG. 6C, the patch parts have L-shaped slots and are arbitrarily shaped and, in FIG. 6D, both the patch parts and the slots are arbitrarily shaped. Similar to FIGS. 6A and 6B, the dashed line in FIGS. 6C and 6D divides the patch into two parts. One patch part in each of FIGS. 6C and 6D is smaller in size (i.e., 630 and 640 in FIGS. 6C and 6D, respectively) and, therefore, a high frequency resonator while the other patch part is larger in size (i.e., 625 and 635 in FIGS. 6C and 6D, respectively) and, therefore, a low frequency resonator. The slots on each of the patch parts divide the patch parts into two sub-parts, each of which is resonant at a different frequency in the same frequency band to which the respective patch part is tuned. In FIG. 6C, for example, the larger patch part 625 is divided into two sub-parts 625A and 625B and the smaller patch part 630 is divided into sub-parts 630A and 630B. Similarly in FIG. 6D, the larger patch part 635 is divided into two sub-parts 635A and 635B and the smaller patch part 640 is divided into sub-parts 640A and 640B. As a result, wide bandwidth matching can be realized by the configurations in FIGS. 6C and 6D.

Figure 8:
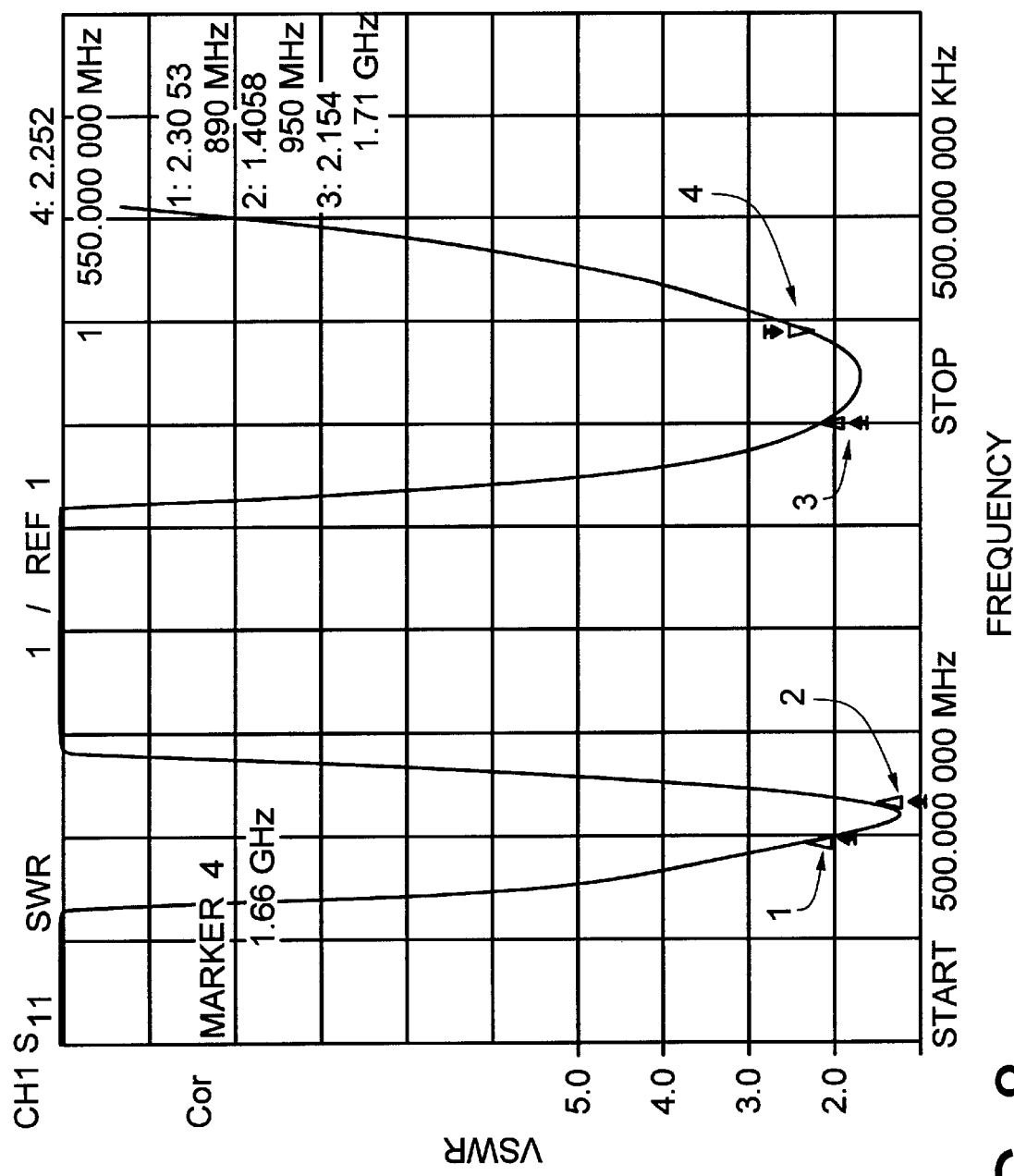
FIG. 8 illustrates a simulation result of a GSM/DCS dual band patch antenna of the present invention.

In order to illustrate the effectiveness of the present invention, FIG. 8 sets forth results of a simulation for the exemplary dual band patch antenna illustrated in FIG. 4B. The two-part dual band patch antenna has a length 0.1 wavelength, a width of 0.12 wavelength and a height of 0.02 wavelength. The parts of the patches are made resonant at the GSM and DCS frequency bands. The bandwidth is 8.7% (i.e., about 80 MHz) at the GSM band and 9.4% (i.e., about 170 MHz) at the DCS frequency band for a VSWR less than 2.5:1. FIG. 5 illustrates the VSWR performance of this design. As is evident from FIG. 5, this antenna can meet the requirements of a GSM/DCS dual band application.

The foregoing has described the principles, preferred embodiments and modes of operation of the present invention. However, the invention should not be construed as being limited to the particular embodiments discussed above. For example, while the antenna of the present invention has been discussed primarily as being a radiator, one skilled in the art will appreciate that the dual band patch antenna of the present invention would also be used as a sensor for receiving information at specific frequencies. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A communication device for use in a radio communication system, said device comprising:

a microphone opening for allowing the communication device to receive auditory information from a user;

a speaker opening for allowing the communication device to transmit auditory information to said user;

a keypad; and a built-in multiple band patch antenna comprising:

a feeding pin;

a ground pin;

a matching bridge, positioned between the feeding pin and ground pin;

a first patch part tuned to a first frequency band, a second patch part connected to said first patch part only by said matching bridge and tuned to a second different frequency band, and at least one slot formed in each of said first and second patch parts.

2. The communication device of claim 1 wherein said first frequency band is a lower frequency band and said second frequency band is a higher frequency band.

3. The communication device of claim 1 wherein said patch parts are of an arbitrary three-dimensional shape.

4. The communication device of claim 1 wherein said patch parts are of an arbitrary two-dimensional shape.

5. The communication device of claim 1 further comprising a matching bridge for matching an input impedance of said antenna.

6. The communication device of claim 5 wherein the matching of said antenna is adjusted by changing a length of the matching bridge.

7. The communication device of claim 1 wherein said at least one slot divides each patch part into sub-parts.

8. The communication device of claim 7 wherein each sub-part of a respective patch part is resonant at a different frequency within the frequency band to which the respective patch part is tuned.

9. The communication device of claim 1 wherein said at least one slot in each of said patch parts is of a shape so as to form said patch parts into a twin spiral configuration.

10. The communication device of claim 1 wherein the frequency band to which each patch part is tuned is dependent on a size of the patch part.

11. The communication device of claim 1 further comprising:

a printed circuit board; and a substrate onto which said built-in multiple band patch antenna is mounted, said substrate is mounted on said printed circuit board.

12. The communication device of claim 1 wherein sizes of the patch parts are selected to be approximately ¼ wavelength of the different frequency bands to which the patch parts are to be tuned.

13. A communication device for use in a radio communication system, said device comprising:

a printed circuit board mounted on a chassis of said communication device;

a substrate attached to said printed circuit board and having a predetermined thickness; and a patch antenna mounted on said substrate and comprising a plurality of patch parts, each having at least one slot formed therein, which are tuned to different frequency bands;

a matching bridge by which the patch parts are separated;

wherein a first of said plurality of patch parts is tuned to a lower band and a second of said plurality of patch parts is tuned to a higher band; and wherein said at least one slot separates each patch part into a plurality of sub-parts, the sub-parts for each patch part are resonant at different frequencies within a same frequency band.

14. The communication device of claim 13 further comprising a matching bridge for matching an input impedance of said antenna and located between a feeding point and a ground post.

15. The communication device of claim 14 wherein the matching of said antenna is adjusted by changing a length of the matching bridge.

16. The communication device of claim 13 wherein sizes of said plurality of patch parts are selected to be approximately ¼ wavelength of the different frequency bands to which the patch parts are to be tuned.

17. The communication device of claim 13 where a bandwidth of said antenna depends on a size of said patch parts, a shape and location of said at least one slot, and the thickness and dielectric constant of said substrate.

18. The communication device of claim 13 wherein each of said patch parts is of an arbitrary two-dimensional or three-dimensional shape.

19. The communication device of claim 13 wherein a shape of said at least one slot is arbitrary.

20. An antenna for a radio communication device, said antenna comprising:
   a plurality of patch parts, each of which is tuned to a different frequency band; and
   at least one slot formed on each of said plurality of patch parts for dividing the patch parts into sub-parts, each sub-part of a patch part is resonant at a different frequency within a frequency band to which the patch part is tuned;
   a matching bridge by which the patch parts are separated, wherein said antenna is a built-in antenna.

21. The antenna of claim 20 wherein a first patch part is resonant at frequencies in a lower band and a second patch part is resonant at frequencies in a higher band.

22. The antenna of claim 21 wherein a size of said first patch part is larger than a size of said second patch part.

23. The antenna of claim 20 wherein said patch parts are connected to a printed circuit board of said radio communication device via a substrate.

24. The antenna of claim 23 wherein a bandwidth of said antenna is dependent on a size of said patch parts, a shape and location of said at least one slot and a thickness and dielectric constant of said substrate.

25. The antenna of claim 20 wherein shapes of said patch parts and said at least one slot are arbitrary.

26. A method for forming a multiple band, patch antenna comprising a patch and a matching bridge, said method comprising the steps of:
   forming a slot in said patch so that said patch is divided into multiple parts, each patch part is connected to each other only at said matching bridge and each of said multiple parts is of a size so as to be resonant at a different frequency; and
   forming at least one slot in each patch part so as to divide each patch part into a plurality of sub-parts, each sub-part of a patch part is resonant at a different frequency within a same frequency band to which the patch part is tuned.

27. The method of claim 26 wherein said steps of forming is performed by one of cutting, etching, chemical processing, and metalization.

28. A system for producing a multiple band, patch antenna comprising a patch and a matching bridge, said system comprising:
   means for forming a slot in said patch so that said patch is divided into multiple parts, each patch part is connected to each other only at said matching bridge and each of said multiple parts is of a size so as to be resonant at a different frequency; and
   means for forming at least one slot in each patch part so as to divide each patch part into a plurality of sub-parts, each sub-part of a patch part is resonant at a different frequency within a same frequency band to which the patch part is tuned.

29. The system of claim 28 wherein said means for forming forms said slots by one of cutting, etching, chemical processing, and metalization.

\* \* \* \* \*